United States Patent [19]

Kamijoh

[11] Patent Number: 5,357,398
[45] Date of Patent: Oct. 18, 1994

[54] DEGAUSSING CIRCUIT

[75] Inventor: Naoyoshi Kamijoh, Tokyo, Japan

[73] Assignee: Kabushiki Kaisha Toshiba, Kawasaki, Japan

[21] Appl. No.: 3,823

[22] Filed: Jan. 8, 1993

Related U.S. Application Data

[63] Continuation of Ser. No. 676,177, Mar. 28, 1991, abandoned.

[30] Foreign Application Priority Data

Mar. 28, 1990 [JP] Japan ................................. 2-76661

[51] Int. Cl.$^5$ .............................................. H01F 13/00
[52] U.S. Cl. ..................................... 361/267; 361/149
[58] Field of Search ........................... 361/149 ∝ 151, 361/154, 267; 307/101; 335/284; 315/8, 85

[56] References Cited

U.S. PATENT DOCUMENTS

| | | | |
|---|---|---|---|
| 3,433,993 | 3/1969 | Norley | 361/150 X |
| 4,135,219 | 1/1979 | Yoshizawa et al. | 361/149 X |
| 4,153,858 | 5/1979 | Schylander | 361/150 X |
| 4,218,722 | 8/1980 | Yoshizawa | 361/149 |
| 4,384,313 | 5/1983 | Steingroever et al. | 361/149 |
| 4,829,214 | 5/1989 | Lendaro | 361/150 X |
| 4,887,184 | 12/1989 | Armond | 361/149 |
| 4,950,955 | 8/1990 | Hoover et al. | 361/150 X |

FOREIGN PATENT DOCUMENTS 0069840 1/1983 European Pat. Off. .

Primary Examiner—A. D. Pellinen
Assistant Examiner—Fritz M. Fleming
Attorney, Agent, or Firm—Cushman, Darby & Cushman

[57] ABSTRACT

A degaussing circuit has a degaussing coil, an oscillator, amplifiers, a bias source, a capacitor, a switch and a time period controller. The oscillator supplies high frequency alternating currents which are amplified by the amplifiers to drive the degaussing coil. The bias source and capacitor activate the amplifiers. The capacitor applies a gradually reducing bias to the amplifiers. The switch controls the charging and discharging of the capacitor and thus causes the application of the gradual reducing bias to the amplifiers. The time period controller regulates the operation period of the switch and, therefore, the charge and discharge of the capacitor.

8 Claims, 2 Drawing Sheets

DEGAUSSING CIRCUIT

This is a continuation of application Ser. No. 07/676,177, filed on Mar. 28, 1991, which was abandoned upon the filing hereof now abandoned.

FIELD OF THE INVENTION

The present invention relates generally to a degaussing circuit, and more particularly, to a degaussing circuit for CRT display devices.

BACKGROUND OF THE INVENTION

The picture quality of CRT display is deteriorated when the CRT display device is magnetized by the effect of terrestrial magnetism. The CRT display is equipped with a degaussing circuit to degausse the magnetized CRT.

One example of the prior art is explained hereinafter referring to FIG. 1. Shown in FIG. 1 is the circuit diagram showing a conventional degaussing circuit. An AC power supply source 10 is connected to a positive temperature coefficient thermister (referred to as PTC, hereinafter) 12, a degaussing coil 14 and a relay switch 16 in series.

The relay switch 16 is kept closed for a fixed time period by a degaussing time period controller 18 which is interlocking with a manual switch 20 for starting the degaussing operation and applies AC current to the degaussing coil 14.

The PTC 12 is heated when a current is supplied thereto. Therefore, the resistance of the PTC 12 is increased.

When the resistance of the PTC 12 has increased, an AC current flowing through the degaussing coil 14 is gradually attenuated and thus, a degaussing effect is obtained.

In the prior art degaussing circuit as shown in FIG. 1, the PTC 12 is heated to increase its resistance, and thus gradually decrease AC current being supplied to the degaussing coil 14.

However, once the PTC 12 is heated, its temperature does not drop immediately and its resistance is also restored. Therefore, once the degaussation has been carried out, another operation of degaussation is difficult to effect immediately after the prior operation A required current for the degaussation cannot be supplied sufficiently to the degaussing coil 14 at that time. This is attributable to the fact that the PTC 12 once heated requires about 10 to 20 mins for dissipating its temperature before voltage application. During this time period, the resistance of the PTC 12 does not drop sufficiently for effective degaussing operations.

Therefore, if an orientation of the CRT display device is frequency changed, it is difficult to degausse the CRT display device immediately after every orientation change.

Further, as the degaussing coil 14 is connected to the AC power supply source, an electrostatic induction from the degaussation circuit to raster scanning circuits, such as a horizontal oscillation circuit and a vertical oscillation circuit, causes a picture fluctuation and a jitter on the screen.

SUMMARY OF THE INVENTION

It is, therefore, an object of the present invention to provide a degaussing circuit in which its degaussing ability can be immediately restored for successive operations.

Another object of the present invention to provide a degaussing circuit which hardly causes a picture fluctuation and a jitter on the screen during the degaussation.

In order to achieve the above object, a degaussing circuit according to one aspect of the present invention includes a degaussing coil, an oscillator or supplying a high frequency current to the degaussing coil, an amplifier for amplifying the a current of predetermined frequency for driving the degaussing coil, a bias source for supplying an operating voltage to the amplifier, a capacitor for applying a gradually reducing bias to the amplifier, a switch for controlling the capacitor for charging the capacitor when the switch is turned ON and then for causing the gradual reduction of the bias change, and a time period controller for regulating the operation period of the switch thus causing the charge and the discharge of the capacitor.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
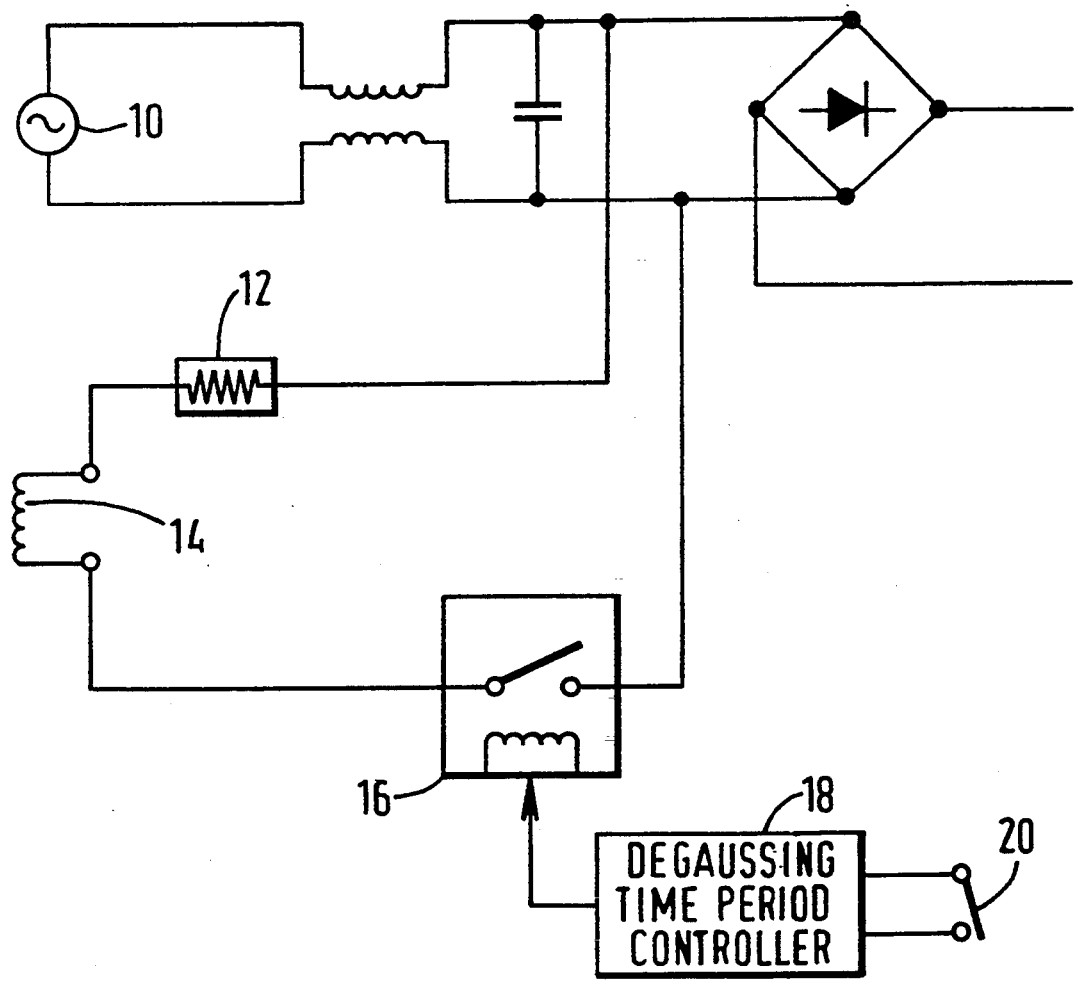
FIG. 1 is a circuit diagram showing a conventional degaussing circuit.

The present invention will be described in detail with reference to FIG. 2. In the drawing, reference numerals or letters used in FIG. 1 will be used to designate like or equivalent elements for simplicity of explanation.

Figure 2:
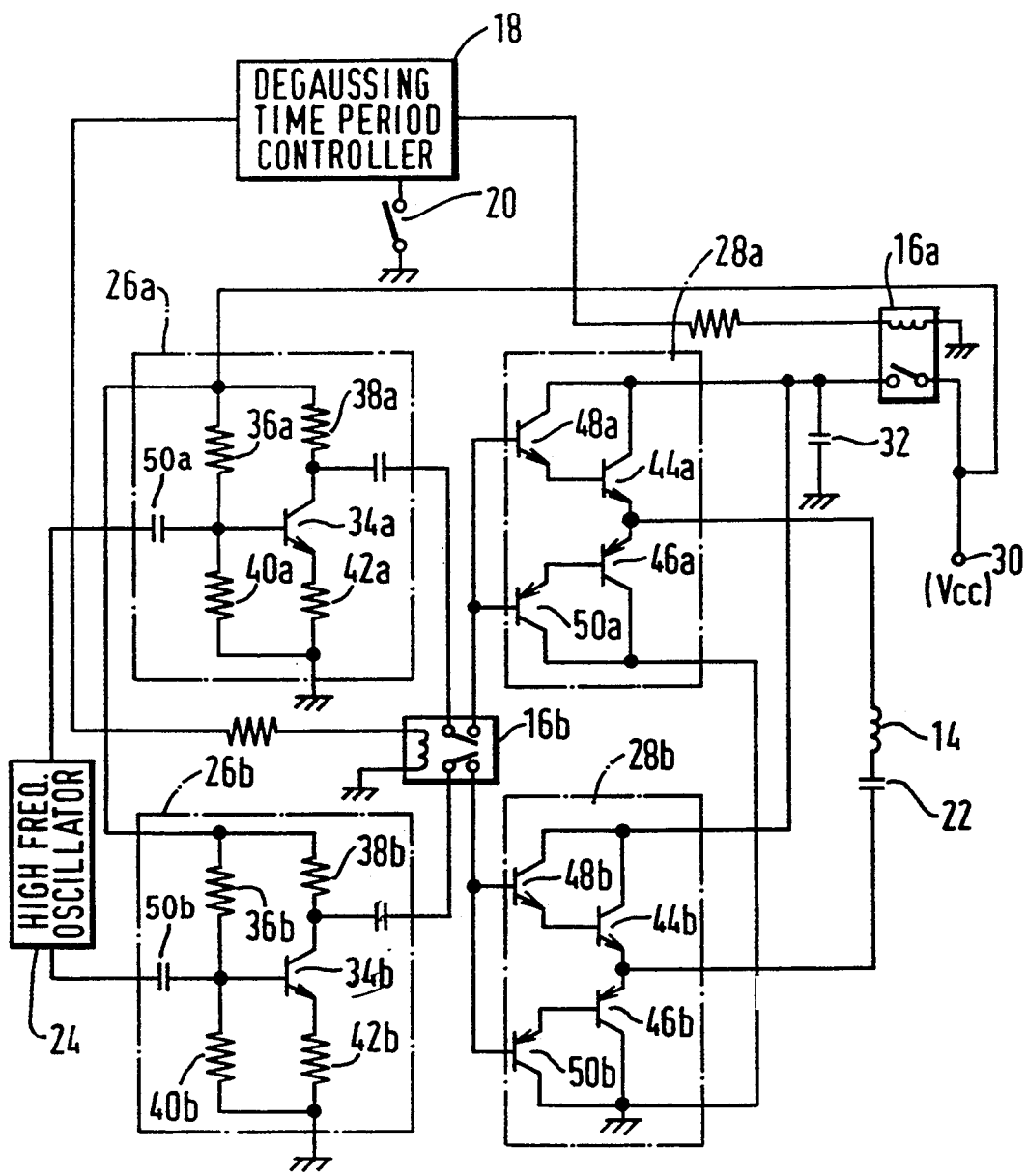
FIG. 2 is a circuit diagram showing an embodiment of the degaussing circuit according to the present invention.

In FIG. 2, the degaussing circuit comprises a degaussing coil 14, a first capacitor 22, an oscillator 24, a pair of pre-amplifiers 26a and 26b, a pair of power amplifiers 28a and 28b, a DC voltage supply source 30 with a DC voltage Vcc, a first relay switch 16a, a second relay switch 16b, a second capacitor 32, a degaussing time period controller 18 and a manual switch 20.

The oscillator 24 generates a pair of alternating currents, e.g., at a frequency of about 1 KHz, which phases are mutually inversed. The pre-amplifiers 26a and 26b amplify the currents at predetermined frequency from the oscillator 24, respectively. The power amplifiers 28a and 28b intensify the outputs of the pre-amplifiers 26a and 26b for driving the degaussing coil 14.

The degaussing coil 14 and the first capacitor 22 are coupled in series, so that they constitute a resonance circuit having a resonance frequency equal to the oscillation frequency of the oscillator 24.

The DC voltage supply source 30 supplies the DC voltage Vcc to the pre-amplifiers 26a and 26b and the power amplifiers 28a and 28b. The first relay switch 16a serves to control power supplies for the power amplifiers 28a and 28b. The second relay switch 16b serves to control the supply of the current of predetermined frequency to the degaussing coil 14.

The second capacitor 32 interlocks with the first relay switch 16a for applying a gradually attenuating bias to the power amplifiers 28a and 28b. Thus, the power of the current of predetermined frequency applied to the degaussing coil 14 is also gradually attenuated. This presents the degaussing operation.

The pre-amplifiers 26a and 26b may be conventional ones. For example, the pre-amplifier 26a includes a NPN transistor 34a as an amplifying element. The transistor 34a is biased by resistors 36a, 38a, 40a and 42a. The preamplifier 26b also includes another NPN transistor 34b as an amplifying element. The transistor 34b is biased by resistors 36b, 38b, 40b and 42b. Then the currents of predetermined frequency are applied to the bases of the transistors 34a and 34b through coupling capacitors 50a and 50b, respectively.

The DC voltage supply source 30 is connected to the ground potential source via the series resistors 36a, 40a and 38a, 42a. The base of the transistor 34a is connected to the voltage dividing point of the series resistors 36a and 40a and the base of the transistor 34b is connected to the voltage dividing point of the series resistors 38a and 42a to apply base bias to the transistors 34a and 34b.

The collectors of the transistors 34a and 34b are connected to the DC voltage supply source 30 via the resistors 38a and 38b. The emitters of the transistors 34a and 34b are connected to the ground potential source via the resistors 42a and 42b. The transistors 34a and 34b amplify AC signals applied to their bases and output through the collectors. However, as the phases of the currents of predetermined frequency flowing to respective bases are inverted, currents of the predetermined frequency with mutually inverted phases are output from the collectors of the transistors 34a and 34b.

When the second relay switch 16b is in the ON state, the amplified currents of predetermined frequency are supplied to the power amplifiers 28a and 28b from the pre-amplifiers 26a and 26b.

The power amplifiers 28a and 28b may also be conventional ones. For example, the power amplifier 28a includes complementary power transistors 44a and 46a as power amplifying elements. The power transistors 44a and 46a are coupled at their bases to the emitters of their own Darlington coupling transistors 48a and 50a, respectively. The power amplifier 28b also includes other complementary power transistors 44b and 46b as power amplifying elements. The power transistors 44b and 46b are coupled at their bases to the emitters of their own Darlington coupling transistors 48b and 50b, respectively.

The currents of predetermined frequency are applied to the bases of the Darlington coupling transistors 48a and 50a output from the pre-amplifiers 26a and 26b, respectively. When a positive current is applied to the bases of a first Darlington coupling transistors 48a and 50a, the Darlington pair of the transistors 48a and 44a are activated (operationally powered, turned on) but a second Darlington pair of the transistor 50a and 46a are deactivated (turned off). On the other hand, a negative current is applied to the bases of the Darlington coupling transistors 48b and 50b and therefore, a fourth Darlington pair of the transistors 50b and 46b are activated (turned on), but a third Darlington pair of the transistors 48b and 44b are deactivated (turned off).

Accordingly, currents flow from the Darlington pair of the transistors 48a and 44a to the transistors 46b and 50b and the ground potential source via the degaussing coil 14 and the first capacitor 22. Inversely, when negative voltage is applied to the bases of the Darlington coupling transistors 48a and 50a and positive voltage is applied to the bases of the Darlington coupling transistors 48b and 50b, the Darlington pair of transistors 48b and 44b are activated and Darlington pair of transistors 50b and 46b are deactivated.

Thus, the currents of predetermined frequency power amplified by the power amplifiers 28a and 28b are applied to the degaussing coil 14.

The second capacitor 32 is charged when the first relay switch 16a is in the ON state and is discharged when the first relay switch 16a is in the OFF state. The discharged current from the second capacitor 32 flows into the power amplifiers 28a and 28b.

Therefore, the supply voltage supplied to the power amplifiers 28a and 28b gradually decreases when the first relay switch 16a is turned OFF, and the outputs from the power amplifiers 28a and 28b gradually decrease, becoming zero (0). The attenuated current resulting from this effect flows to the degaussing coil 14, thus causing the degaussation. High degaussing effect is obtainable if the resonance frequency presented in the series circuit of the degaussing coil 14 and the first capacitor 22 agrees with the oscillation frequency of the oscillator 24. After the degaussation is carried out, the second relay switch 16b turned OFF to prevent current from the flowing of the resonance circuit.

Further, as a modified embodiment of the present invention, when the pre-amplifiers and the power amplifiers are combined into one circuit, another end of the resonance circuit is connected to the ground potential source and signals from the oscillator are made one, the same degaussing effect is obtained.

As described above, the present invention can provide an extremely preferable degaussing circuit.

While there have been illustrated and described what are at present considered to be the preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A degaussing circuit comprising:
 a degaussing coil;
 an oscillator means for supplying first and second alternating currents having a predetermined frequency, said first alternating current having a phase that is the inverse of that of said second alternating current;
 first and second power amplification means for amplifying said first and second alternating currents, respectively, and for driving said degaussing coil by applying said amplified first and second alternating currents to said degaussing coil;
 a first capacitor means for applying a gradually reducing bias to said first and second power amplification means to operationally empower said first and second power amplification means;

a bias source for supplying a bias to said first capacitor means;

first switch means for charging said first capacitor means with said bias from said bias source in an ON state and for causing said first capacitor means to apply said gradually reducing bias to said first and second power amplification means in an OFF state; and a time period controller for regulating the operation period of the switch means, thus causing the first capacitor means to charge and discharge.

2. A degaussing circuit of claim 1, further comprising a second switch means for disconnecting the amplified first and second alternating currents from the degaussing coil means after the completion of the discharge operation of the first capacitor.

3. The degaussing circuit of claim 2, further comprising a second capacitor means coupled in series with the degaussing coil means for presenting a resonance to amplified first and second alternating currents.

4. A degaussing circuit as in claim 1, wherein said amplified first and second alternating currents are alternately applied to said degaussing coil means by said first and second power amplification means.

5. A degaussing circuit as in claim 4, wherein said first and second power amplification means each comprise first and second pairs of Darlington transistors.

6. A degaussing circuit as in claim 5, wherein when said first alternating current is positive said first and second pair of Darlington transistors in said first power amplification means are turned on and off respectively, and when said second alternating current is negative said first and second pair of Darlington transistors are turned off and on respectively.

7. A degaussing circuit comprising:

a degaussing coil;

oscillator means for supplying first and second alternating currents having a predetermined frequency, said first alternating current having a phase that is the inverse of that of said second alternating current;

first and second power amplification means for amplifying said first and second alternating currents, respectively, and for driving said degaussing coil by applying said amplified first and second alternating currents to said degaussing coil based on the phase of said first and second alternating currents;

a first capacitor means for applying a gradually reducing bias to said first and second power amplification means to operationally empower said first and second power amplification means;

a bias source for supplying a bias to said first capacitor means;

first switch means for charging said first capacitor means with said bias from said bias source in an ON state and for causing said first capacitor means to apply said gradually reducing bias to said first and second power amplification means in an OFF state; and a time period controller for regulating the operation period of the switch means, thus causing the first capacitor means to charge and discharge.

8. A degaussing circuit as in claim 7, wherein said first and second amplification means include means for applying said amplified first alternating current to said degaussing coil in a first direction when said amplified first alternating current is positive, and means for applying said amplified second alternating current to said degaussing coil in a second direction, opposite said first direction, when said amplified second alternating current is positive.

* * * * *